United States Patent
Heap et al.

(10) Patent No.: US 8,282,526 B2
(45) Date of Patent: Oct. 9, 2012

(54) METHOD AND APPARATUS TO CREATE A PSEUDO TORQUE PHASE DURING ONCOMING CLUTCH ENGAGEMENT TO PREVENT CLUTCH SLIP FOR A HYBRID POWERTRAIN SYSTEM

(75) Inventors: Anthony H. Heap, Ann Arbor, MI (US); Lawrence A. Kaminsky, Sterling Heights, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1031 days.

(21) Appl. No.: 12/250,520

(22) Filed: Oct. 13, 2008

(65) Prior Publication Data

US 2009/0111645 A1 Apr. 30, 2009

Related U.S. Application Data

(60) Provisional application No. 60/983,259, filed on Oct. 29, 2007.

(51) Int. Cl.
*B60W 10/02* (2006.01)
*B60W 10/04* (2006.01)
(52) U.S. Cl. ............... 477/5; 477/83; 477/180; 477/181
(58) Field of Classification Search .............. 477/5, 77, 477/83, 180, 181
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 7,722,497 B2 * | 5/2010 | Tabata et al. | 477/3 |
| 7,744,502 B2 * | 6/2010 | Dreibholz et al. | 477/5 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |

(Continued)

FOREIGN PATENT DOCUMENTS

EP 1564055 A2 8/2005

(Continued)

*Primary Examiner* — Edwin A Young

(57) ABSTRACT

A method for controlling a powertrain comprising an electro-mechanical transmission mechanically-operatively coupled to an engine and an electric machine adapted to selectively transmit mechanical power to an output member through selective application of a plurality of torque-transfer clutches includes monitoring a clutch slip speed, synchronizing an oncoming clutch, and constraining reactive clutch torque limits for the oncoming clutch to achieve a reactive clutch torque that is less than an estimated clutch torque capacity.

8 Claims, 8 Drawing Sheets

U.S. PATENT DOCUMENTS

| | | |
|---|---|---|
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2006/0258506 A1* | 11/2006 | Ibamoto et al. .................. 477/5 |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |

| | | | | | | |
|---|---|---|---|---|---|---|
| 2009/0118932 A1 | 5/2009 | Heap | | 2009/0118950 A1 | 5/2009 | Heap |
| 2009/0118933 A1 | 5/2009 | Heap | | 2009/0118951 A1 | 5/2009 | Heap |
| 2009/0118934 A1 | 5/2009 | Heap | | 2009/0118952 A1 | 5/2009 | Heap |
| 2009/0118935 A1 | 5/2009 | Heap | | 2009/0118954 A1 | 5/2009 | Wu |
| 2009/0118936 A1 | 5/2009 | Heap | | 2009/0118957 A1 | 5/2009 | Heap |
| 2009/0118937 A1 | 5/2009 | Heap | | 2009/0118962 A1 | 5/2009 | Heap |
| 2009/0118938 A1 | 5/2009 | Heap | | 2009/0118963 A1 | 5/2009 | Heap |
| 2009/0118939 A1 | 5/2009 | Heap | | 2009/0118964 A1 | 5/2009 | Snyder |
| 2009/0118940 A1 | 5/2009 | Heap | | 2009/0118969 A1 | 5/2009 | Heap |
| 2009/0118941 A1 | 5/2009 | Heap | | 2009/0118971 A1 | 5/2009 | Heap |
| 2009/0118942 A1 | 5/2009 | Hsieh | | 2009/0118999 A1 | 5/2009 | Heap |
| 2009/0118943 A1 | 5/2009 | Heap | | 2009/0144002 A1 | 6/2009 | Zettel |
| 2009/0118944 A1 | 5/2009 | Heap | | | | |
| 2009/0118945 A1 | 5/2009 | Heap | | | | |
| 2009/0118946 A1 | 5/2009 | Heap | | | | |
| 2009/0118947 A1 | 5/2009 | Heap | | | | |
| 2009/0118948 A1 | 5/2009 | Heap | | | | |
| 2009/0118949 A1 | 5/2009 | Heap | | | | |

FOREIGN PATENT DOCUMENTS

| | | | |
|---|---|---|---|
| EP | 1564056 | A2 | 8/2005 |

\* cited by examiner

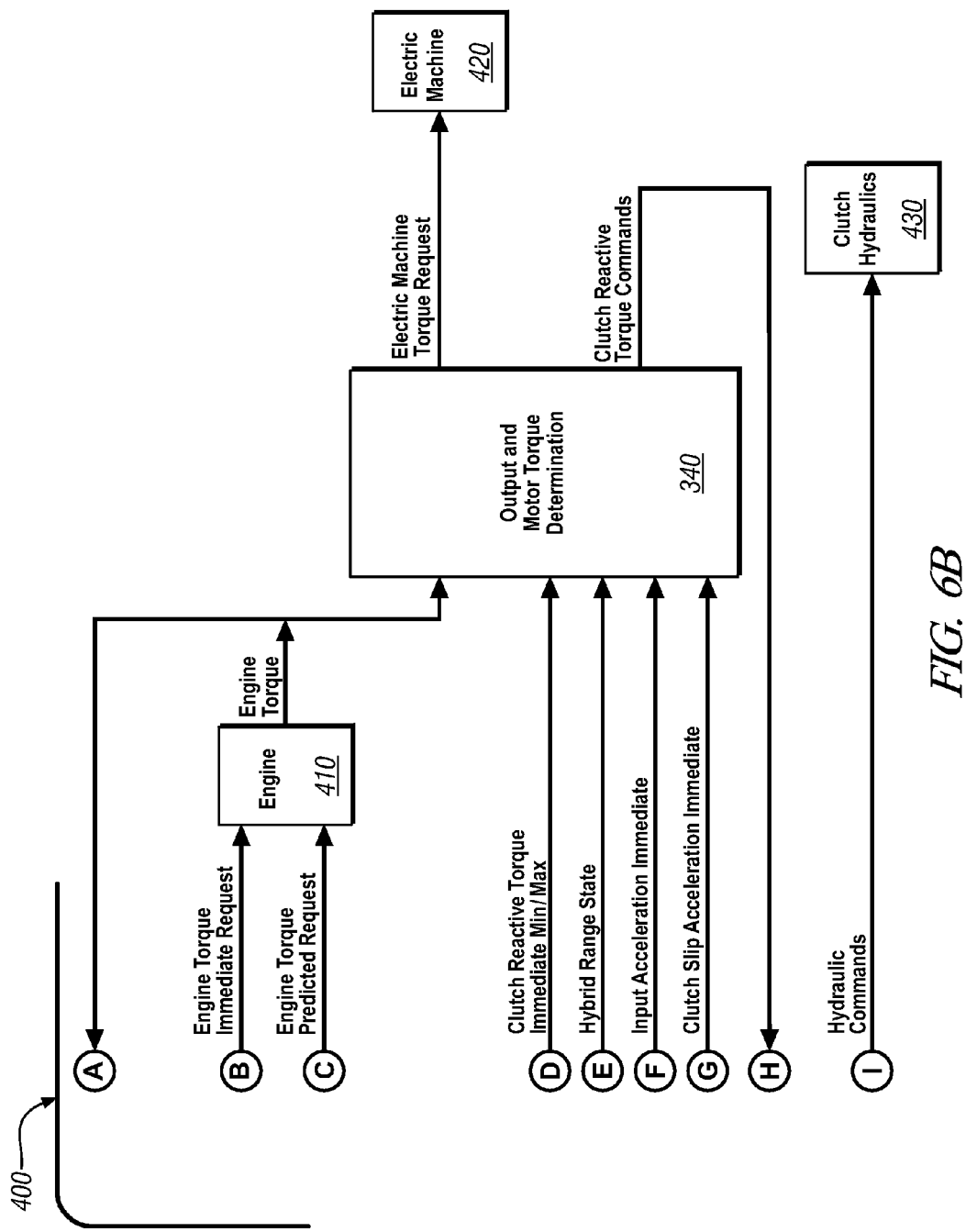

METHOD AND APPARATUS TO CREATE A PSEUDO TORQUE PHASE DURING ONCOMING CLUTCH ENGAGEMENT TO PREVENT CLUTCH SLIP FOR A HYBRID POWERTRAIN SYSTEM

CROSS REFERENCE TO RELATED APPLICATIONS

This application claims the benefit of U.S. Provisional Application No. 60/983,259 filed on Oct. 29, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid drive vehicle require management of numerous torque bearing shafts or devices representing connections to the above mentioned engine, electrical motors, and driveline. Various control schemes and operational connections between the various aforementioned components of the hybrid drive system are known, and the control system must be able to engage and disengage the various components in order to perform the functions of the hybrid drive system. Engagement and disengagement are known to be accomplished through the use of a transmission employing clutches. Clutches are devices well known in the art for engaging and disengaging shafts including the management of rotational velocity and torque differences between the shafts. Engagement or locking, disengagement or unlocking, and operation while engaged or locked operation are all transmission states that must be managed in order for the vehicle to operate properly and smoothly. These implications to vehicle operation are collectively described as part of a vehicle characteristic called drivability.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged and desynchronized, to synchronized with no clamping force applied, to engaged but with only minimal clamping force, to engaged with some maximum clamping force. Clamping force applied to the clutch determines how much reactive torque the clutch can carry before the clutch slips. Clutches can be designed to operate with some level of controlled slip in asynchronous operation, or clutches can be designed to operate with little or preferably no slip in synchronous operation. This disclosure deals with clutches designed primarily for synchronous operation. Variable control of clutches through modulation of clamping force allows for transition between locked and unlocked states and further allows for managing slip in a locked transmission. In addition, the maximum clamping force capable of being applied by the hydraulic lines can also vary with vehicle operating states and can be modulated based upon control strategies.

Slip, or relative rotational movement between the connective surfaces of the clutch, occurs whenever the reactive torque transmitted through the clutch exceeds the actual torque capacity created by the applied clamping force. Slip in a transmission results in unintended loss of control within the transmission and adverse affects to drivability.

Transitioning from an unlocked to a locked state requires a transitional locking state, through which a clutch begins in an unlocked state with no reactive torque being carried across the clutch, and ends in a locked synchronized state with connective surfaces clamped together. Once a locked state has been achieved, a transitional locking event or a period of ramping the clutch up to a desired or demanded reactive torque is performed. Orderly application of reactive torque through the transitional locking event or state, facilitating optimal drivability of the vehicle without slip, can be difficult to achieve. As described above, whenever the reactive torque transmitted through the clutch exceeds the actual clutch capacity created by the applied clamping force, slip occurs. Because the transitional locking event necessarily involves a rapid increase torque, input torques from the engine and the electric machine or machines creating too much reactive torque through a clutch during a transitional locking event create risk to drivability as potential slip.

SUMMARY

A method for controlling a powertrain comprising an electro-mechanical transmission mechanically-operatively coupled to an internal combustion engine and an electric machine adapted to selectively transmit mechanical power to an output member through selective application of a plurality of torque-transfer clutches includes monitoring a clutch slip speed, synchronizing an oncoming clutch, and constraining reactive clutch torque limits for the oncoming clutch to achieve a reactive clutch torque that is less than an estimated clutch torque capacity.

BRIEF DESCRIPTION OF THE DRAWINGS

One or more embodiments will now be described, by way of example, with reference to the accompanying drawings, in which.

DETAILED DESCRIPTION

Figure 1:
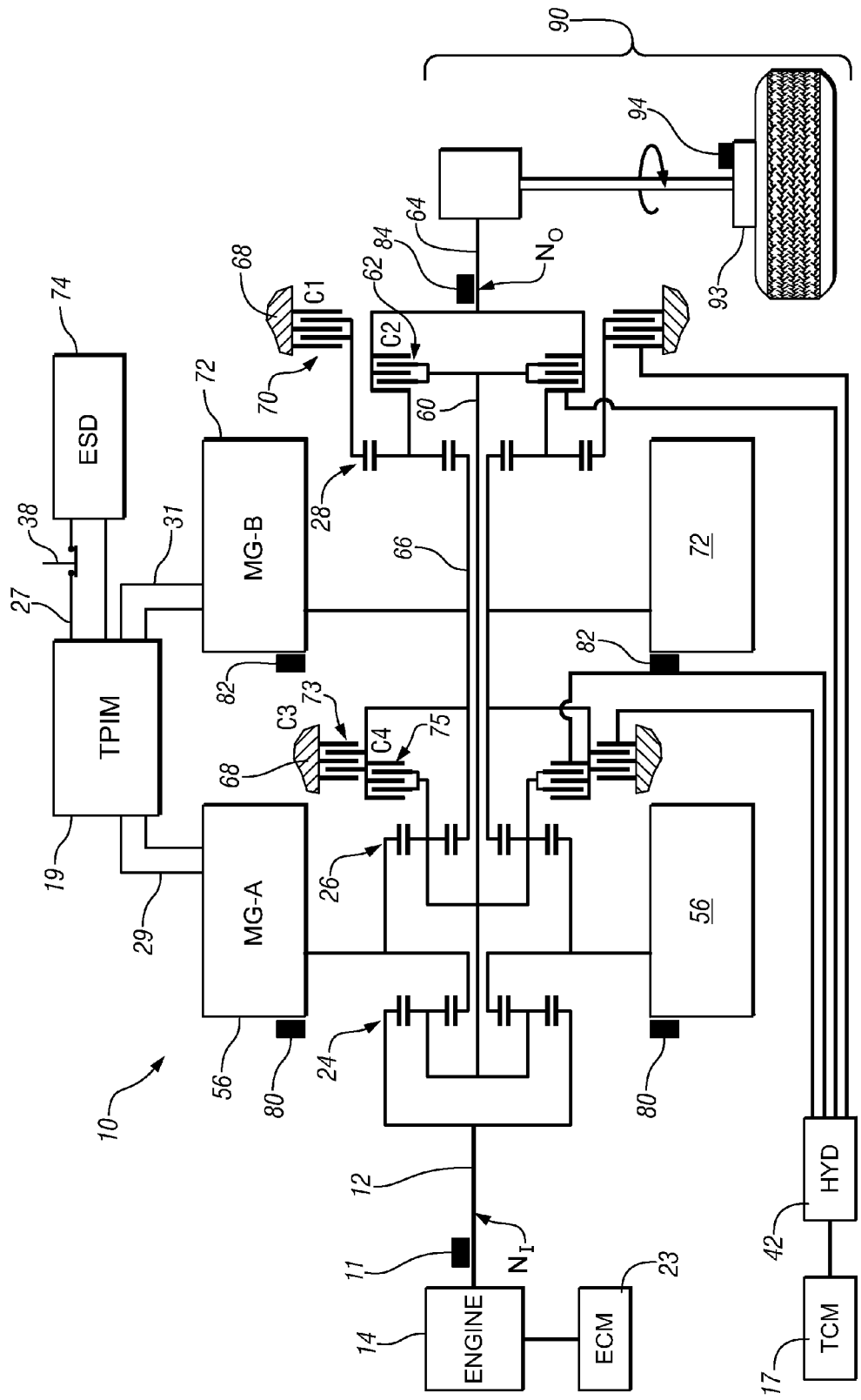
FIG. 1 is a schematic diagram of an exemplary powertrain in accordance with the present disclosure.

Referring now to the drawings, wherein the showings are for the purpose of illustrating certain exemplary embodiments only and not for the purpose of limiting the same, FIGS. A and B depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

Figure 2:
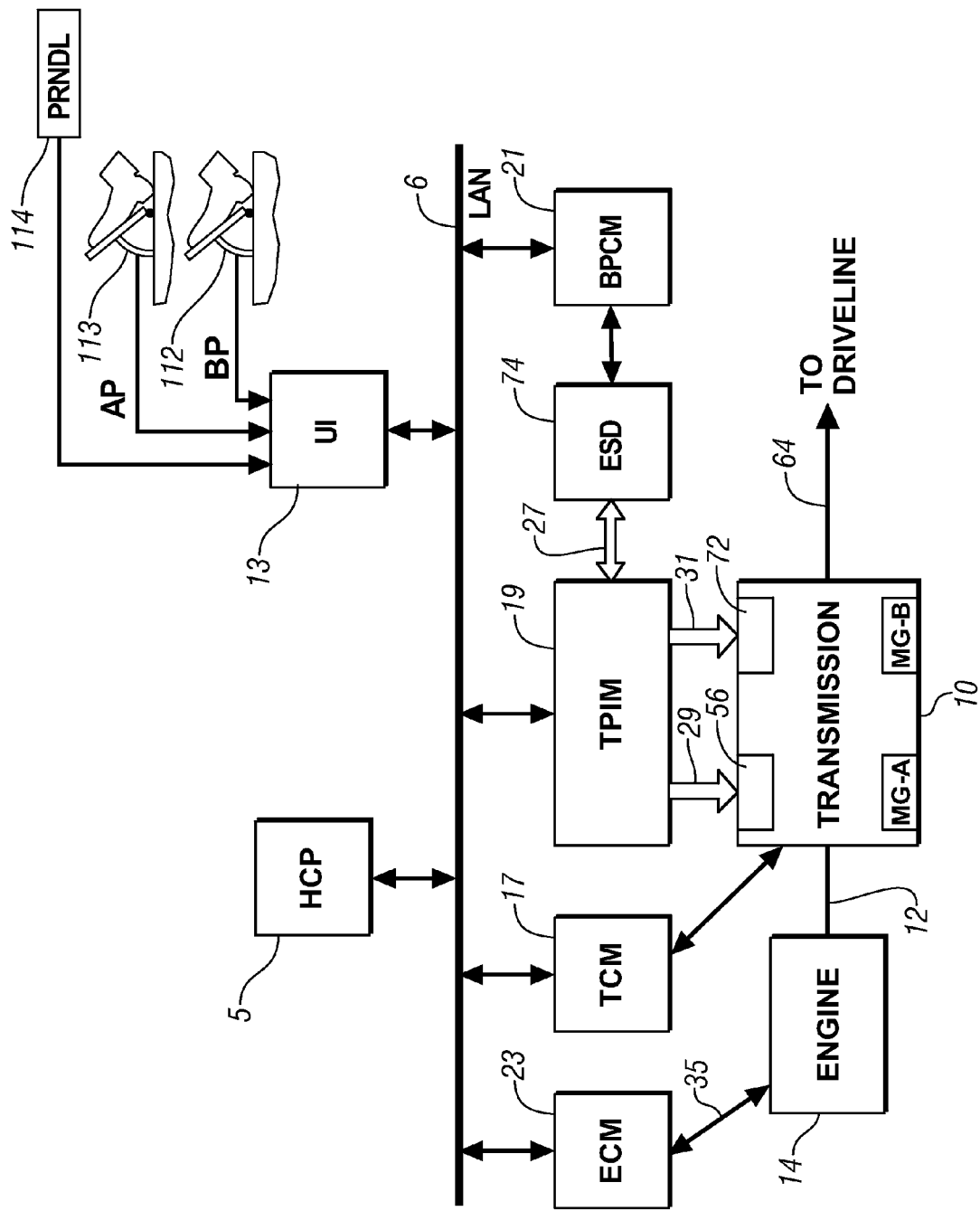
FIG. 2 is a schematic diagram of an exemplary architecture for a control system and powertrain in accordance with the present disclosure.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5.

The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
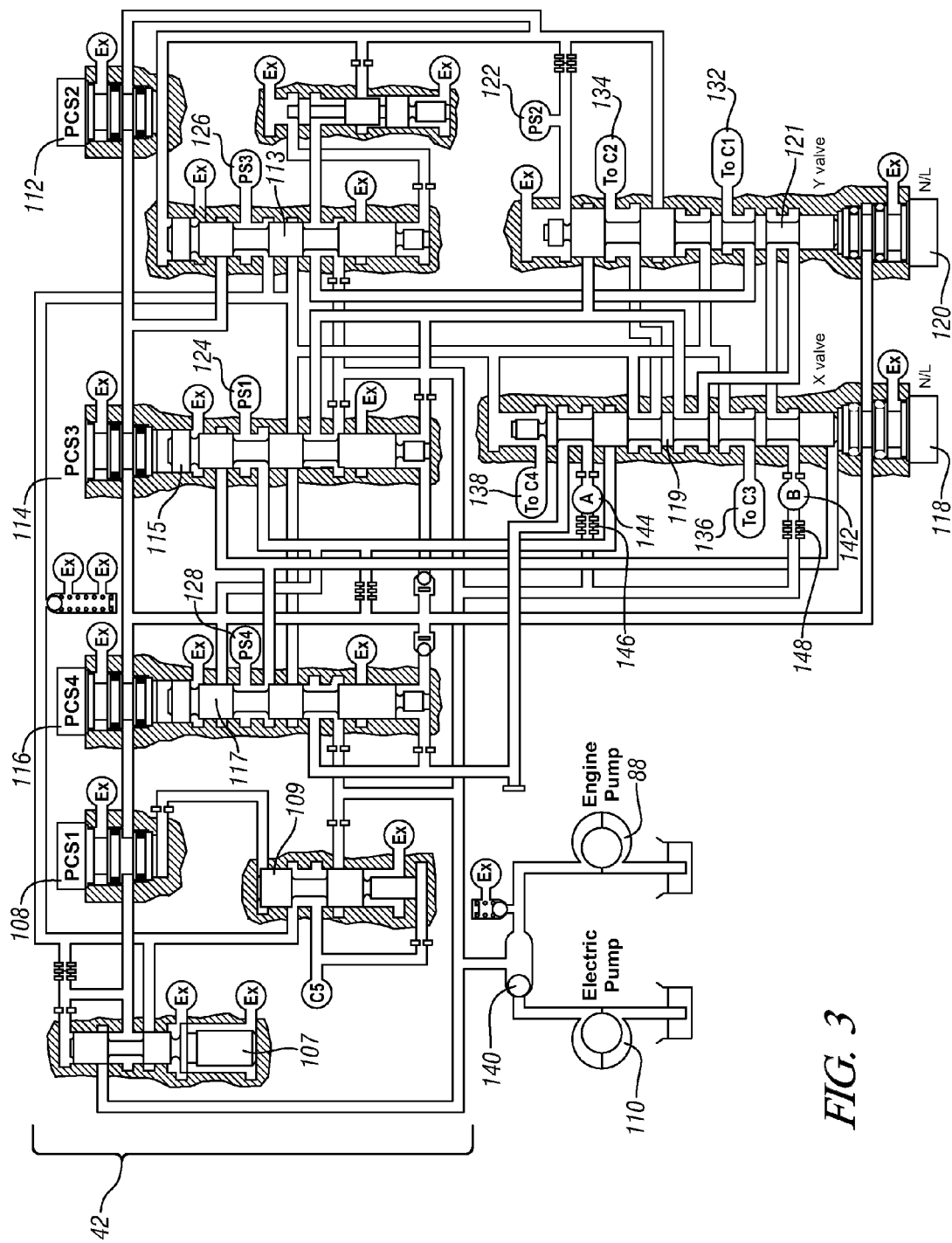
FIG. 3 is a schematic diagram of a hydraulic circuit in accordance with the present disclosure.

FIG. 3 depicts a schematic diagram of the hydraulic control circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic control circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As mentioned above, clutch slip is an event which occurs when the load or torque transmitted through a clutch or reactive torque exceeds an actual torque capacity of the clutch. The torque applied overcomes the static frictional forces between the connective surfaces of the clutch, and the connective surfaces rotate relative to each other. One method in steady clutch operation to avoid clutch slip is to modulate the clamping force available to the clutch control mechanism, where a greater clamping force results in a greater actual torque capacity. However, increasing available clamping force, for example, by boosting pressure to a hydraulic clutch control system, has limitations. For example, in transient operation, input torques can change more quickly than hydraulic pressure can be boosted, and a large change in applied reactive torque in a short period of time can result in the torques exceeding the actual torque capacity at the existing hydraulic pressure. In a transitional clutch locking event, an unlocked clutch first undergoes a locking state, wherein clutch connective surfaces are synchronized and joined substantially without any reactive torque, clamping force is ramped up to the clutch, and reactive torque is applied in order to generate the demanded torque across the clutch. Slip in a locking event, particularly in a transmission designed for synchronous operation, adversely affects drivability by disrupting the intended output torque, therefore impacting power applied to the drivetrain. A method is disclosed whereby input torques from various sources can be limited during a transitional locking event, maintaining the reactive torque below an estimated torque capacity of the clutch, such that slip events are prevented.

Figure 4:
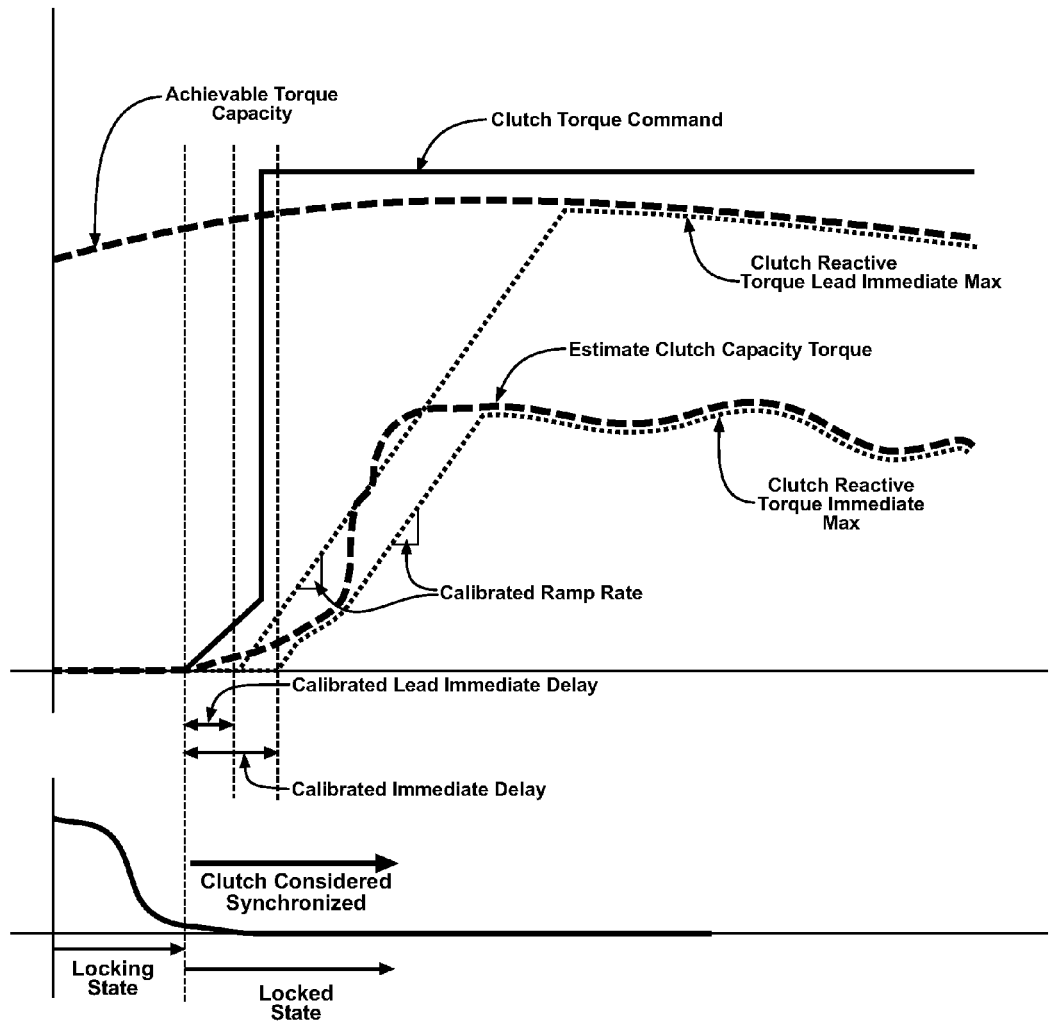
FIG. 4 is a graphical representation of a transitional locking event and an associated application of reactive torque to a clutch in accordance with the present disclosure.

FIG. 4 is a graphical representation of an exemplary transitional locking event and an associated application of reactive torque to a clutch in accordance with the present disclosure. The graph consists of two portions, synchronized by a common time scale, through a transitional locking event. The top graph depicts torque terms associated with the transitional locking event, and the bottom graph depicts clutch slip speed. As demonstrated by the high clutch slip speed and the reactive torque terms at zero, the clutch initially is in an unsynchronized state, with the engine and the electric machine or machines operating independently of the clutch. Upon command from a TCM or other control system as described above, the clutch is synchronized through a transitional locking state, and the connective surfaces within the clutch are attuned at a substantially common rotational velocity. Once synchronization is achieved, the clutch is considered to be in a locked state, however the clutch does not have any capacity to carry a reactive torque without slip. As described above, the clutch torque capacity of a clutch depends upon the clamping force applied to the clutch. Once the clutch is locked, clamping force can be increased, resulting in an increase in the clutch torque capacity. By maintaining reactive torque below the clutch torque capacity, reactive torque can be applied and increased to the clutch without causing any slip.

Because the application of the clamping force and the ability of the clutch to transfer torque without slip is time dependent, where the clutch torque capacity must be present to handle the applied torque load, managing reaction times of hybrid drive components to changes in commands is important to reducing potential for slip in transient conditions. As is known by one having ordinary skill in the art, any control system includes a reaction time. A transitional locking event, requiring controlled reactions within the clutch as an increase in clamping force and within the engine and the electric machine or machines as an increase in input torques, must balance the reaction times of these components in order to maintain the torque capacity of the clutch above the applied reactive torque, thereby avoiding slip, while executing the clutch shift command in as short of a time span as possible. Increases in torque capacity of a clutch are controlled by a commanded clutch torque from the clutch control system. Reaction time within a clutch to changes in commanded torque is impacted by a number of factors, including the particulars of the clutch design and the control method of the clutch control system. In the exemplary embodiment of the clutch control system described above, utilizing a hydraulic system to exert clamping force within the clutches, contributors to reaction time include time required to activate solenoids and valves controlling hydraulic pressures and time required for pressure changes in the hydraulic medium to propagate through connected circuits. Changes to input torque supplied from an engine are controlled by engine torque commands setting the torque output of the engine, for example, as controlled through an ECM. Reaction time within an engine to changes in commanded torque is impacted by a number of factors well known in the art, and the particulars of a change to engine operation depend heavily on the particulars of the engine employed and the mode or modes of combustion being utilized. In many circumstances, the reaction time of an engine to control commands will be the longest reaction time of the components to the hybrid drive system. Changes to input torque supplied from an electric machine are frequently controlled by electric signals to the electric machine or machines involved in producing the torque. Reaction time within an electric machine and electric machine control circuits include time to activate any necessary switches, relays, or other controls and time to energize or de-energize the electric machine with the change in applied electrical power.

While a method can be utilized to perform the increases associated with a transitional locking event in sequence, with the torque capacity being the first parameter to be increased followed by increases in reactive torque, time involved in a locking transition is also important to drivability. Therefore, it is advantageous to perform associated increases in parallel while still acting to prevent slip. Such parallel implementation of control changes intending to effect increases associated with a transitional locking event in as short of a time-span as possible while still preventing slip must schedule command timing for the various increases while accounting for reaction times in the various hybrid drive components involved.

FIG. 4 illustrates an exemplary execution of timing considerations which can be utilized during a transitional locking event. As described above, after a TCM or another exemplary control system determines that the clutch is to be transitioned from an unlocked state to a locked state, synchronization of the clutch is first achieved, resulting in a locked state. Once the clutch is considered to be in a locked state, demand torque in the form of a clutch torque command can be transferred by a control system to the clutch. The initiation of this clutch torque command requires a series of subordinate commands necessary to transition the synchronized but unloaded clutch to a fully operational state, for instance, with fill commands in a hydraulically activated system, with the clutch transferring a reactive torque up to limits based upon physical characteristics of the clutch and associated systems. As described above, a method is disclosed whereby input torques from various sources can be limited during a transitional locking event, maintaining the reactive torque below an estimated torque capacity of the clutch, such that slip events are prevented. In relation to the initiation of commands during the transitional locking event, clutch capacity must be increased before reactive torque to the clutch can be increased. Therefore, because clutch capacity is a first prerequisite to accomplish the loading of reactive torque to the clutch, an increase in clutch capacity can commanded anticipatorily to achieve an initial increase in clutch capacity coincident with the clutch reaching a locked state. Reactive torques, taking into account reaction times, can then be timely commanded with a short lag to follow increasing clutch torque capacity. An exemplary method to command the increases to reactive torque is depicted in FIG. 4, estimated reactive torque resulted from input and electric machine torques, as limited by an clutch reactive torque immediate maximum acting as a constraint upon electric machine torque commands, is initiated after a calibrated immediate delay from the initiation of the clutch torque command and is raised at a calibrated ramp rate. The delay and ramp rate are selected values which are most likely to bring the reactive torque up to normal levels quickly while staying below the increasing estimated clutch torque capacity. However, as depicted in the exemplary data, the estimated clutch torque capacity can be compared to the clutch reactive torque immediate maximum command, and the ramped increase in the torque command can be adjusted if the estimated clutch torque capacity impinges upon the ramped increase in the reactive torque command. It should be noted in the exemplary method that the command to increase input torque through the clutch reactive torque immediate maximum is only the command to increase torque. By insuring that the reactive torque command to the electric machine lags the increasing clutch torque capacity, the reaction time of the electric machine to the reactive torque command will further delay the actual application of reactive torque, thereby preventing the occurrence of slip. As described above, the reaction time of input torque from the engine to changes in commands is frequently longer than the reaction times of other hybrid drive components. Commands to the engine must, similarly to commands to the electric machine, create increasing reactive torque to the clutch lagging the increasing clutch torque capacity. The exemplary method therefore provides commands to the engine in the form of a clutch reactive torque lead immediate maximum, with the lead calibrated to issue commands to the engine before corresponding commands are issued to the electric machine, with timing set by a calibrated lead immediate delay, and utilizing the same calibrated ramp rate as the clutch reactive torque immediate maximum, such that resulting increases in input torques from both sources increase at substantially the same time and same rate. It will be appreciated by one having ordinary skill in the art that engines and electric machines in a hybrid drive system work together to provide torque to a driveline. The input torque values from the engine and the electric machines as depicted in FIG. 4 are not additive, but rather describe the maximum values permitted of each component in supplying a portion of the total input torque. By thusly timing the clutch reactive torque immediate maximum commands of the electric machine to the initiation of the clutch torque command and corresponding known behavior of the increasing clutch torque capacity and by timing the clutch reactive torque lead immediate maximum commands of the engine to the clutch reactive torque immediate maximum, reactive torque transmitted through a clutch can be increased in parallel to an increasing clutch torque capacity while still preventing slip.

While the above described method as described in FIG. 4 depicts one method to increase reactive torques in parallel to an increasing clutch torque capacity, the method described utilizes an exemplary process. Other embodiments of this method are envisioned. For example, a method can, instead of selecting an clutch reactive torque immediate maximum command to slightly lag the estimated clutch torque capacity, alternatively select the clutch reactive torque lead immediate command to correspond to the estimated clutch torque capacity, for instance, by leading the estimated clutch torque capacity by some small amount less than the reaction time of the engine and, if an anomalous estimated clutch torque capacity increase is diagnosed, recovering to still preventing slip. Alternatively, the clutch reactive torque clutch reactive torque lead immediate maximum and the clutch reactive torque immediate maximum can be selected and implemented to effect an increase in reactive torque lagging by some measure the increasing estimated torque capacity. Alternatively, instead of utilizing set calibrated delay and ramp values, an algorithm diagnosing or projecting clamping forces or otherwise estimating clutch torque capacity throughout a transitional locking event based upon some initial values can be utilized in real time, initiating and controlling increases in reactive torque commands based upon projections rather than through calibrated ramp and delay values. Alternatively, a plurality of calibrated ramp and delay values can be stored in a memory device or other method to store tabulated data, and values can be looked up and utilized in accordance with hybrid drive system reactions to certain properties such as temperature or maintenance history. The particular embodiments described herein in connection with the above described method are exemplary illustrations, and the disclosure is not intended to be limited in any way thereto.

Figure 5:
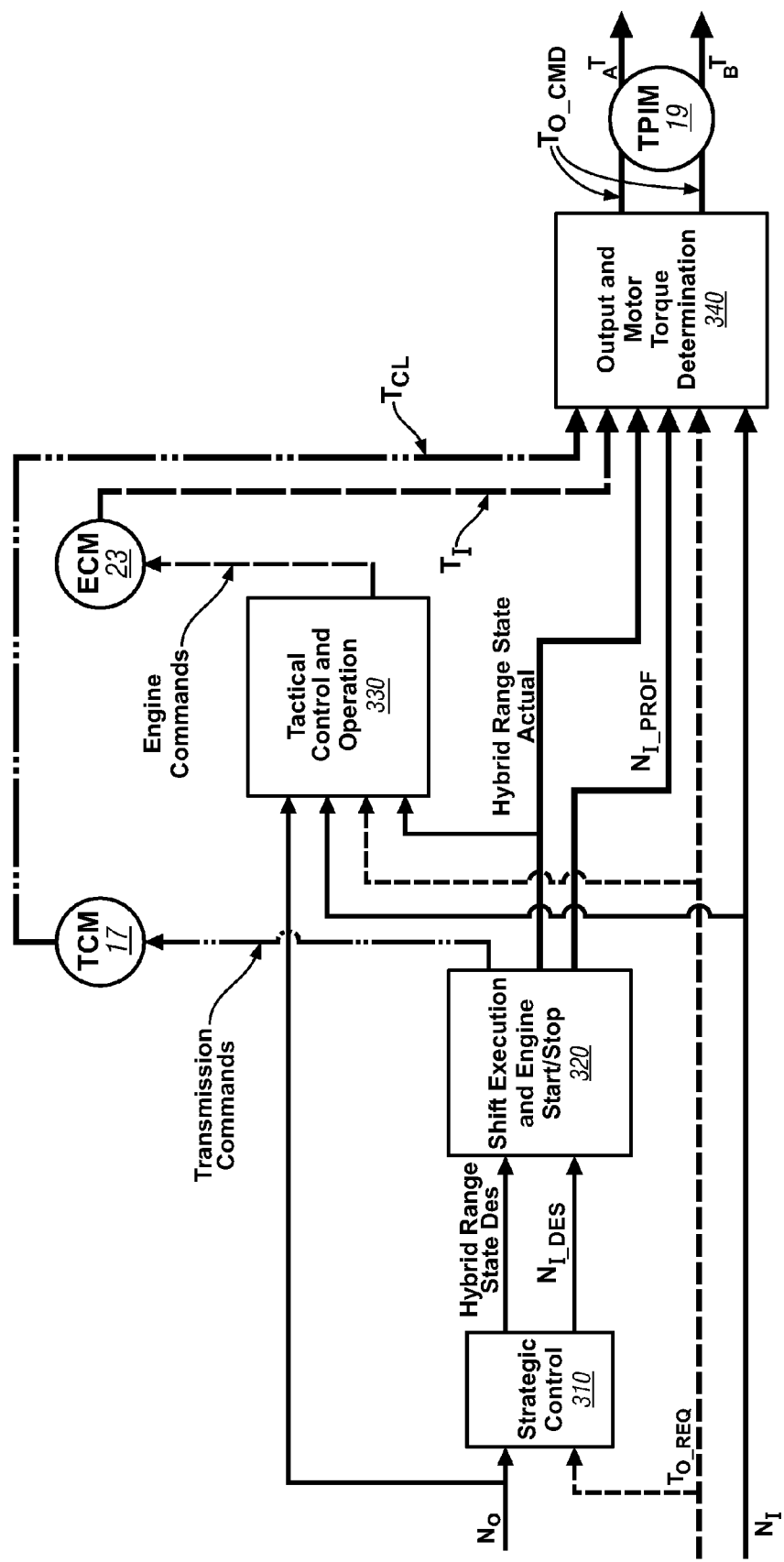
FIG. 5 shows an exemplary control system architecture for controlling and managing torque and power flow in a powertrain system having multiple torque generative devices and residing in control modules in the form of executable algorithms and calibrations, in accordance with the present disclosure.

FIG. 5 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 5 depicts a flow of pertinent signals through the control modules. In operation, the operator inputs to the accelerator pedal 113 and the brake pedal 112 are monitored to determine the operator torque request ('$T_{O\_REQ}$'). Operation of the engine 14 and the transmission 10 are monitored to determine the input speed ('$N_I$') and the output speed ('$N_O$'). A strategic optimization control scheme ('Strategic Control') 310 determines a preferred input speed ('$N_{I\_DES}$') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('$N_{I\_PROF}$') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('$T_{CL}$') for each clutch is estimated in the TCM 17, including the presently applied clutches and the non-applied clutches, and a present engine input torque ('$T_I$') reacting with the input member 12 is determined in the ECM 23. A motor torque control scheme ('Output and Motor Torque Determination') 340 is executed to determine the preferred output torque from the powertrain ('$T_{O\_CMD}$'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figure 6A:
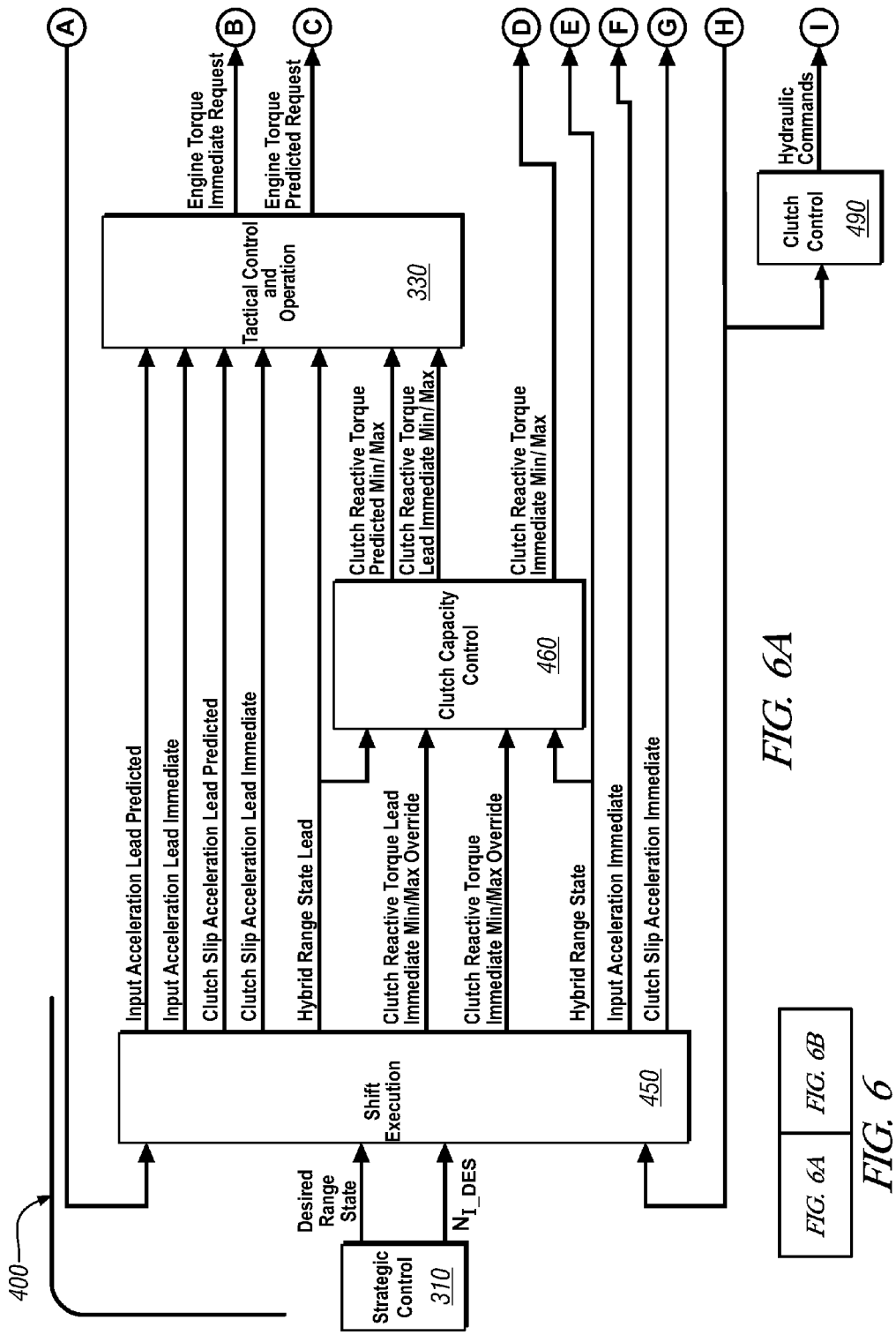
FIG. 6 is a schematic diagram exemplifying data flow through a shift execution, describing more detail exemplary execution of the control system architecture of FIG. 5 in greater detail, in accordance with the present disclosure.

FIG. 6 is a schematic diagram exemplifying data flow through a shift execution, describing more detail exemplary execution of the control system architecture such as the system of FIG. 5 in greater detail, in accordance with the present disclosure. Powertrain control system 400 is illustrated comprising several hybrid drive components, including an engine 410, an electric machine 420, and clutch hydraulics 430. Control modules strategic control module 310, shift execution module 450, clutch capacity control module 460, tactical control and operation module 330, output and motor torque determination module 340, and clutch control module 490, are illustrated, processing information and issuing control commands to engine 410, electric machine 420, and clutch hydraulics 430. These control modules can be physically separate, can be grouped together in a number of different control devices, or can be entirely performed within a single physical control device. Module 310, a strategic control module, performs determinations regarding preferred powertrain operating points and preferred operating range states as described in FIG. 5. Module 450, a shift execution module, receives input from strategic control module 310 and other sources regarding shift initiation. Module 450 processes inputs regarding the reactive torque currently transmitted through the clutch and the preferred operating range state to be transitioned to. Module 450 then employs programming, determining parameters for the execution of the shift, including hybrid range state parameters describing the balance of input torques required of the torque providing devices, details regarding a target input speed and input acceleration lead predicted required to execute the transition to the preferred operating range state, an input acceleration lead immediate as previously described, and clutch reactive torque lead immediate minimum and maximum and clutch reactive torque immediate minimum and maximum values as previously described. From module 450, clutch reactive torque parameters and hybrid range state information are fed to clutch capacity control module 460, lead control parameters and signals are fed to tactical control and operation module 330, and immediate control parameters and signals are fed to output and motor torque determination module 340. Clutch capacity control module 460 processes reactive torque and hybrid range state information and generates logic describing clutch reactive torque limits enabling engine control through module 330, electric machine control through module 340, and clutch control through module 490, in accordance with methods described herein. Tactical control and operation module 330 includes means to issue torque requests and execute limits upon input torque supplied from engine 410, and feed, additionally, describe the input torque supplied from the engine to module 340 for use in control of electric machine 420. Output and motor torque determination module 340 likewise receives and processes information to issue electric machine torque requests to electric machine 420. Additionally, module 340 generates clutch reactive torque commands for use by clutch control module 490. Module 490 processes information from modules 460 and 340 and issues hydraulic commands in order to achieve the required clutch torque capacity required to operate the transmission. This particular embodiment of data flow illustrates one possible exemplary process by which a vehicular torque generative devices and related clutches can be controlled in accordance with the method disclosed herein. It will be appreciated by one having ordinary skill in the art that the particular process employed can vary, and this disclosure is not intended to limited to the particular exemplary embodiment described herein.

Figure 7:
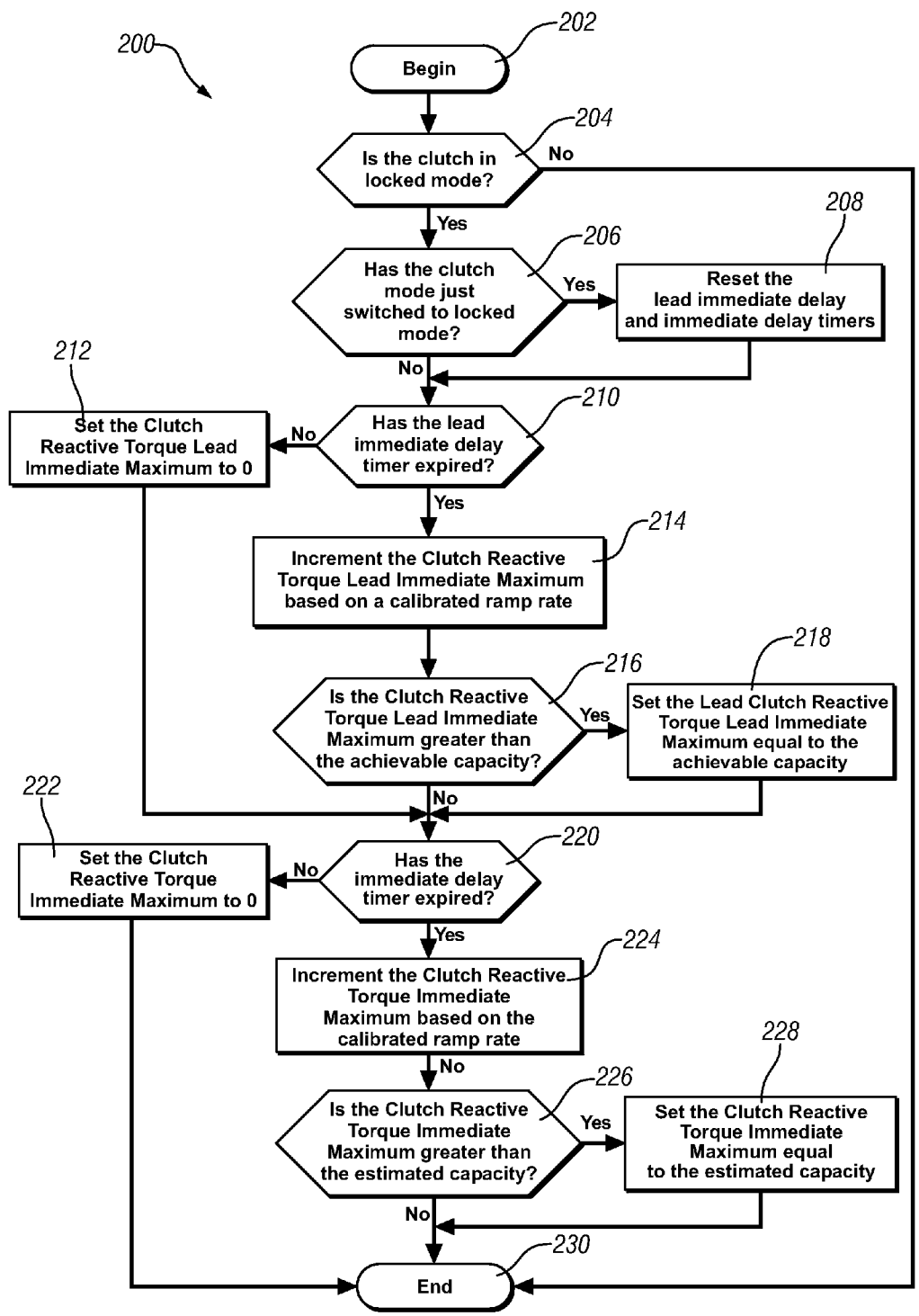
FIG. 7 is a flowchart demonstrating an exemplary process whereby limits may be imposed upon an engine and electric machine through a transitional locking event in order to prevent slip in accordance with the present disclosure.

FIG. 7 is a flowchart demonstrating an exemplary process whereby limits may be imposed upon an engine and electric machine through a transitional locking event in order to prevent slip in accordance with the present disclosure. Through process 200, as illustrated, a clutch reactive torque lead immediate maximum and a clutch reactive torque immediate maximum are defined and ramped up after respective delay periods. The process is iterative and runs in multiple cycles in order to initiate and ramp up reactive torque for the subject clutch. At step 202, the process begins. At step 204, the state of the clutch is checked to see if the clutch is locked. As described above, it is preferred to synchronize the clutch before applying clamping force in order to initiate the ramping up of clutch torque capacity and the reactive torque. If the clutch is not locked, then the process proceeds to end at step 230. If the clutch is locked, then the process proceeds to step 206. At step 206, the status of the process is checked, and if this iteration of process 200 is the first iteration since the clutch reached a locked state, then the process proceeds to step 208, wherein a lead immediate delay timer and an immediate delay timer are reset. Either from step 206 or step 208, the process proceeds to step 210. As described above, an lead immediate delay is utilized to time the initiation of the ramping up of the clutch reactive torque lead immediate maximum. Step 210 evaluates, based upon the timers reset in step 208, whether the lead immediate delay has expired. If the timer indicating the delay period has expired, then the process proceeds to step 214. If the timer indicating the delay period has not expired, then the process proceeds to step 212. At step 212, with the process still in the lead immediate delay period, the clutch reactive torque lead immediate maximum is set to zero, and the process proceeds to step 220. In the alternative, at step 214, the clutch reactive torque lead immediate maximum is incrementally increased at a calibrated ramp rate and the process proceeds to step 216. At step 216, the clutch reactive torque lead immediate maximum, increased at step 214, is compared to a calculated or estimated achievable torque capacity, designating the maximum torque capacity that can be commanded by the clutch control system, including any boost capacity available to increase clamping force within the clutch. If the clutch reactive torque lead immediate maximum is determined to be in excess of the achievable capacity of the clutch, then, at step 218, the clutch reactive torque lead immediate maximum is set to the achievable capacity of the clutch. Either from step 212, 216, or 218, the process proceeds to step 220. As described above, an immediate delay is utilized to time the initiation of the ramping up of the clutch reactive torque immediate maximum. Step 220 evaluates, based upon the timers reset in step 208, whether the immediate delay has expired. If the timer indicating the delay period has expired, then the process proceeds to step 224. If the timer indicating the delay period has not expired, then the process proceeds to step 222. At step 222, with the process still in the immediate delay period, the clutch reactive torque immediate maximum is set to zero, and the process proceeds to step 230. In the alternative, at step 224, the clutch reactive torque immediate maximum is incrementally increased at the same calibrated ramp rate utilized in step 214 and the process proceeds to step 226. At step 226, the clutch reactive torque immediate maximum, increased at step 224, is compared to a calculated or estimated torque capacity based upon current operational capacities. If the clutch reactive torque immediate maximum is determined to be in excess of the current estimated capacity of the clutch, then, at step 228, the clutch reactive torque immediate maximum is set to the estimated capacity of the clutch. Either from step 222, 226, or 228, the process proceeds to end at step 230. As aforementioned, process 200 reiterates in order to incrementally effect changes to the reactive torque commands. One having ordinary skill in the art will appreciate that the process may reiterate independently or as part of a broader control cycle.

The above method describes a process for transitioning a single clutch from an unlocked state to a locked state, carrying a reactive torque. Related methods are envisioned, wherein a plurality of clutches can be substantially simultaneously transitioned, wherein all of the clutch torque capacities are coordinated with various input torques to prevent slip, for instance, if a vehicle transitioned from one extreme setting to another. Multiple clutches, previously carrying zero or low reactive torque loads, can simultaneously be in transition to carrying high or maximum reactive torque loads. In such an exemplary application of the above method, different clutches can face potential slip in different ranges of the reactive torque increase. For example, a first clutch may need input torques constrained in a low torque range, while a second clutch may need input torques constrained in a higher range. A method is envisioned, in accordance with this example, wherein a calibrated ramp rate and associated delay periods can be implemented in conjunction with the first clutch, and at a threshold torque or when estimated clutch torque capacity of the second clutch impinges upon the increasing reactive torque commands, a second calibrated ramp rate corresponding to the second clutch can be utilized. Such a method can be utilized to coordinate increasing reactive torque commands and estimated clutch torque capacitys simultaneously across a plurality of clutches.

The above method and FIG. 4 describe torque management processes as a comparison of positive values. It will be appreciated by one having ordinary skill in the art that clutch torques are described as positive and negative torques, signifying torques applied in one rotational direction or the other. The above method can be used in either positive or negative torque applications, where the magnitudes of the torques are modulated in such a way that the magnitude of the applied reactive torque does not exceed the magnitude of the torque capacity for a particular clutch.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain comprising an electro-mechanical transmission mechanically-operatively coupled to an internal combustion engine and an electric machine adapted to selectively transmit mechanical power to an output member through selective application of a plurality of torque-transfer clutches, the method comprising:
    monitoring a clutch slip speed;
    synchronizing an oncoming clutch; and
    constraining reactive clutch torque limits for said oncoming clutch to achieve a reactive clutch torque that is less than an estimated clutch torque capacity.

2. The method of claim 1, wherein constraining reactive clutch torque limits comprises:
    imposing a clutch reactive torque immediate maximum upon an electric machine torque command, wherein said imposing said clutch reactive torque immediate maximum maintaining said electric machine torque command less than said estimated clutch capacity; and
    imposing a clutch reactive torque lead immediate maximum upon an engine torque command, wherein said imposing said clutch reactive torque lead immediate maximum is based upon effecting substantially same said reactive torque limits as said imposing said clutch reactive torque immediate maximum.

3. The method of claim 2, wherein imposing said clutch reactive torque immediate maximum upon an electric machine torque command comprises:
    imposing upon said electric machine torque command an immediate delay and a calibrated ramp rate, wherein said immediate delay and said calibrated ramp rate are calculated to effect said maintaining said electric machine torque command less than said estimated clutch capacity;
    wherein said imposing said clutch reactive torque immediate maximum upon an electric machine torque command comprises
    imposing upon said electric machine torque command a lead immediate delay and said calibrated ramp rate, wherein said lead immediate delay is calculated based upon an estimated engine command reaction time and an estimated electric machine command reaction time and creates said effecting substantially same said reactive torque limits as said imposing said clutch reactive torque immediate maximum.

4. The method of claim 1, wherein constraining reactive clutch torque limits for the oncoming clutch comprises:
    calculating said estimated clutch torque capacity;
    projecting a clutch torque capacity curve based upon said estimated clutch torque capacity; and
    effecting said constraining reactive clutch torque limits based upon said projecting and based upon an estimated engine command reaction time and an estimated electric machine command reaction time.

5. Method for controlling through a transitional locking event a powertrain comprising an electro-mechanical transmission comprising a selectively activated torque-transfer clutch mechanically-operatively coupled to an internal combustion engine and an electric machine adapted to selectively transmit mechanical power to an output member, the method comprising:
    monitoring a clutch slip speed through a clutch synchronizing event;

diagnosing a locked clutch state based upon said monitoring;

upon said diagnosing said locked clutch state, increasing a clutch torque capacity;

upon running a calibrated lead immediate delay after said diagnosing said locked clutch state, increasing a clutch reactive torque lead immediate maximum command at a controlled ramp rate; and upon running a calibrated immediate delay after said diagnosing said locked clutch state, increasing a clutch reactive torque immediate maximum command at said controlled ramp rate;

wherein said increasing said clutch reactive torque lead immediate maximum command and said increasing said clutch reactive torque immediate maximum command effect a reactive torque lower than said increasing clutch torque capacity throughout said transitional locking event.

6. The method of claim 5, wherein running said calibrated immediate delay and said increasing said clutch reactive torque immediate maximum command at said controlled ramp rate effect said clutch reactive torque immediate maximum command closely lagging said increasing clutch torque capacity.

7. The method of claim 6, wherein running said calibrated lead immediate delay effects said clutch reactive torque lead immediate maximum command such that an input torque from said engine initially increases substantially coincidentally with an input torque from said electric machine.

8. The method of claim 5, further comprising:
estimating said clutch torque capacity;
projecting a clutch torque capacity curve for the remainder of said transitional locking event; and
modulating said controlled ramp rate based upon said estimating.

* * * * *